US010344623B2

(12) United States Patent
Eastwood et al.

(10) Patent No.: US 10,344,623 B2
(45) Date of Patent: Jul. 9, 2019

(54) PRE-DIFFUSER STRUT FOR GAS TURBINE ENGINE

(71) Applicant: UNITED TECHNOLOGIES CORPORATION, Farmington, CT (US)

(72) Inventors: Jonathan Jeffery Eastwood, Newington, CT (US); Dave J. Hyland, Portland, CT (US); Timothy Dale, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 531 days.

(21) Appl. No.: 14/934,435

(22) Filed: Nov. 6, 2015

(65) Prior Publication Data

US 2016/0169049 A1  Jun. 16, 2016

Related U.S. Application Data

(60) Provisional application No. 62/092,497, filed on Dec. 16, 2014.

(51) Int. Cl.
*F01D 25/28* (2006.01)
*F01D 25/24* (2006.01)
(Continued)

(52) U.S. Cl.
CPC ............... *F01D 25/28* (2013.01); *F01D 9/04* (2013.01); *F01D 9/065* (2013.01); *F01D 25/24* (2013.01);
(Continued)

(58) Field of Classification Search
CPC . F01D 9/06; F01D 9/065; F01D 9/041; F04D 29/54; F04D 29/542
See application file for complete search history.

(56) References Cited

U.S. PATENT DOCUMENTS 2,682,363 A * 6/1954 Lombard .................. F23R 3/02
415/115
5,211,003 A * 5/1993 Samuel .................. F01D 9/065
60/751

(Continued)

FOREIGN PATENT DOCUMENTS

EP  2192269 A2  6/2010
WO  2014134513 A1  9/2014

OTHER PUBLICATIONS

European Search Report for Application No. 15200532.8-1610; dated May 24, 2016.

*Primary Examiner* — Craig Kim
*Assistant Examiner* — Katheryn A Malatek
(74) *Attorney, Agent, or Firm* — Cantor Colburn LLP

(57) ABSTRACT

A pre-diffuser of an inner diffuser case of a gas turbine engine may comprise an annular outer wall and an annular inner wall radially inside of the annular outer wall to define a passage for primary airflow therebetween. The pre-diffuser may further comprise at least one strut extending radially between the annular inner wall and the annular outer wall and at least one aperture formed in the strut that extends radially through the strut, the annular inner wall, and the annular outer wall. The pre-diffuser may further comprise at least one hollow cavity formed in the strut, and the hollow cavity may be separate from the aperture.

16 Claims, 6 Drawing Sheets

(51) Int. Cl.
*F01D 9/04* (2006.01)
*F01D 9/06* (2006.01)
*F23R 3/06* (2006.01)
*F23R 3/50* (2006.01)
*F04D 29/54* (2006.01)

(52) U.S. Cl.
CPC .................. *F23R 3/06* (2013.01); *F23R 3/50* (2013.01); *F01D 9/041* (2013.01); *F04D 29/54* (2013.01); *F04D 29/542* (2013.01); *F05D 2220/32* (2013.01); *F05D 2230/21* (2013.01); *Y02T 50/671* (2013.01); *Y02T 50/675* (2013.01)

(56) References Cited

U.S. PATENT DOCUMENTS

| | | | |
|---|---|---|---|
| 5,632,141 A | 5/1997 | Sloop et al. | |
| 2012/0020779 A1* | 1/2012 | Hollman | F04D 29/441 415/208.2 |
| 2014/0178174 A1 | 6/2014 | Caprario et al. | |
| 2014/0255181 A1* | 9/2014 | Ress, Jr. | F04D 29/083 415/213.1 |

* cited by examiner

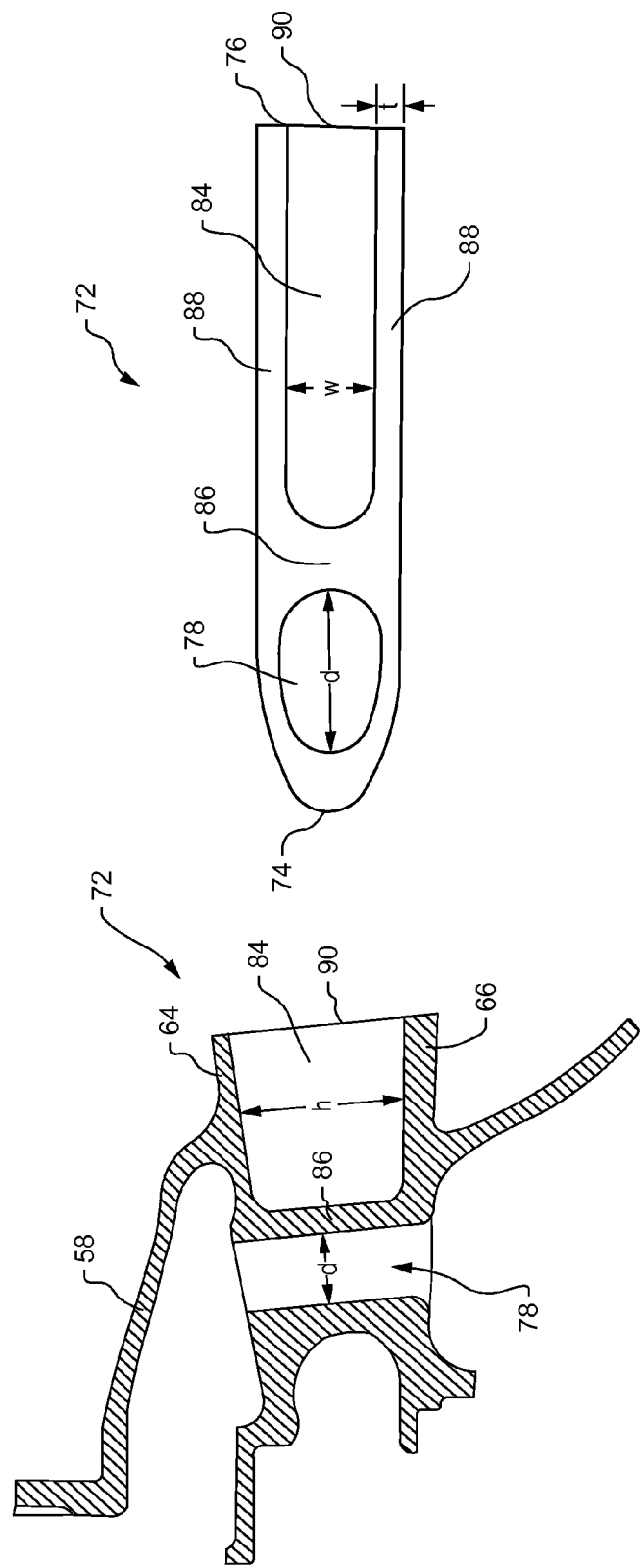

PRE-DIFFUSER STRUT FOR GAS TURBINE ENGINE

CROSS REFERENCE TO RELATED APPLICATIONS

This application is a non-provisional application claiming the 35 U.S.C. § 119(e) benefit of U.S. Provisional Patent Application No. 62/092,497 filed on Dec. 16, 2014.

FIELD OF THE DISCLOSURE

The present disclosure generally relates to gas turbine engines, and more specifically, relates to struts in pre-diffusers of gas turbine engines.

BACKGROUND

Gas turbine engines, such as those used to provide thrust to an aircraft, are internal combustion engines that use air as the working fluid. In general, gas turbine engines may include a fan section and a core engine located downstream of the fan section. In and upstream to downstream direction, the core engine may generally include a compressor section, one or more combustors, and a turbine section. During operation, air may be drawn into the fan section and may be accelerated by the rotating blades of the fan. A fraction of the indrawn air may then be routed through the core engine, where it may be compressed and pressurized by rotating blades of the compressor section before entering the combustor(s). In the combustor, the air may be combusted with fuel to generate hot combustion gases. The hot combustion gases may then expand through and drive the turbine section which may extract energy from the gases to power the compressor section and the turbine section. The gases may then be expelled through an exhaust nozzle to provide forward thrust to an associated aircraft, or to provide power if used in land-based operations.

Prior to entry into the combustor(s), the compressed air exiting the compressor section may have a high temperature and may be traveling at a high velocity. In order to guide the air to the combustor, as well as to reduce the velocity of the compressed air and to condition it for combustion, the gas turbine engine may also include a diffuser case. In particular, the diffuser case may be made up of two components, an inner diffuser case and an outer diffuser case. In addition, the engine may have a pre-diffuser at an outlet of the compressor section which may define a radially-diverging passage for the compressed air exiting the compressor section. Specifically, the passage formed by the pre-diffuser may expand in area from an inlet to an outlet of the pre-diffuser, thereby allowing a reduction of the compressed air velocity via area expansion before it enters the combustor(s). Typically, the pre-diffuser is a feature of the inner diffuser case.

Pre-diffusers may also include a plurality of structurally-supporting struts extending radially between an annular inner wall and an annular outer wall of the pre-diffuser. For example, U.S. Pat. No. 4,198,926 discloses a gas turbine engine pre-diffuser with wedge-shaped struts between the inner and outer walls of the pre-diffuser. While effective, pre-diffuser struts may serve little to no aerodynamic purpose other than enhancing the structural rigidity of the pre-diffuser.

Clearly, there is a need for improved strut designs for pre-diffusers in gas turbine engines.

SUMMARY

In accordance with one aspect of the present disclosure, a pre-diffuser of an inner diffuser case for a gas turbine engine is disclosed. The pre-diffuser may include an annular outer wall and an annular inner wall radially inside of the annular outer wall. The annular outer wall and the annular inner wall may define a passage for primary airflow therebetween. The pre-diffuser may further include at least one strut extending radially between the annular inner wall and the annular outer wall. It may further include at least one aperture formed in the strut, and the aperture may extend radially through the strut, the annular inner wall, and the annular outer wall. The pre-diffuser may further include at least one hollow cavity formed in the strut, and the hollow cavity may be separate from the aperture.

In another refinement, the aperture may provide a passage for secondary cooling airflow between a bearing compartment and an aft portion of a compressor section of the gas turbine engine.

In another refinement, the strut may include a forward side upstream from an aft side, and the hollow cavity may be aft of the aperture on the aft side of the strut.

In another refinement, the strut may include a radially-extending wall separating the aperture and the hollow cavity.

In another refinement, the strut may include two outer walls extending axially between the radially-extending wall and an open end on the aft side of the strut. The two outer walls may further extend radially between the annular inner wall and the annular outer wall.

In another refinement, the two outer walls may define the hollow cavity therebetween, and the hollow cavity may include the open end.

In another refinement, each of the two outer walls may have an average wall thickness of between about 1.5 millimeters and about 2.3 millimeters.

In another refinement, the pre-diffuser may comprise a plurality of the struts, and each of the struts may include an aperture and a hollow cavity.

In another refinement, the pre-diffuser of the inner diffuser case may be cast using a mold.

In another refinement, one or both of the aperture and the hollow cavity may be formed by machining.

In another refinement, the annular inner wall and the annular outer wall may diverge radially with respect to each other from an inlet of the passage to an outlet of the passage.

In accordance with another aspect of the present disclosure, a gas turbine engine is disclosed. The gas turbine engine may comprise a fan section and a core engine downstream of the fan section. The core engine may include a compressor section, a combustor, and a turbine section. The gas turbine engine may further comprise a diffuser case at an outlet of the compressor section, and the diffuser case may have an annular outer diffuser case and an annular inner diffuser case radially inside of the annular outer diffuser case. The inner diffuser case may have a pre-diffuser at an upstream portion of the inner diffuser case. The pre-diffuser may include an annular outer wall and an annular inner wall radially inside of the annular outer wall. The annular outer wall and the annular inner wall may define a passage for primary airflow therebetween. The pre-diffuser may further include at least one strut extending radially between the annular inner wall and the annular outer wall. It may further include at least one aperture formed in the strut, and the aperture may extend radially through the strut, the annular inner wall, and the annular outer wall. The pre-diffuser may further include at least one hollow cavity formed in the strut, and the hollow cavity may be separate from the aperture.

In another refinement, the aperture may provide a passage for secondary cooling airflow between a bearing compartment and an aft portion of the compressor section.

In another refinement, the strut may include a forward side upstream from an aft side, and the hollow cavity may be aft of the aperture on the aft side of the strut.

In another refinement, the strut may include a radially-extending wall separating the aperture and the hollow cavity.

In another refinement, the strut may include two outer walls extending axially between the radially-extending wall and an open end on the aft side of the strut. The two outer walls may further extend radially between the annular inner wall and the annular outer wall.

In another refinement, the two outer walls may define the hollow cavity therebetween, and the hollow cavity may include the open end.

In another refinement, each of the two outer walls may have an average wall thickness of between about 1.5 millimeters and about 2.3 millimeters.

In another refinement, the pre-diffuser may comprise a plurality of the struts, and each of the struts may include an aperture and a hollow cavity.

In another refinement, the annular inner wall and the annular outer wall may diverge radially with respect to each other from an inlet of the passage to an outlet of the passage.

In accordance with another aspect of the present disclosure, a method for fabricating an inner diffuser case of a gas turbine engine is disclosed. The inner diffuser case may have a pre-diffuser that may include an annular outer wall, an annular inner wall radially inside of the annular outer wall, a strut extending radially between the annular inner wall and the annular outer wall, an aperture formed in the strut that extends radially through the strut and the annular inner wall and the annular outer wall, and a hollow cavity formed in the strut. The method may comprise providing a mold for the inner diffuser case, and the mold may be configured to shape the annular outer wall, the annular inner wall, the strut, the aperture, and the hollow cavity of the pre-diffuser. The method may further comprise pouring a metallic material into the mold, solidifying the metallic material in the mold to provide the inner diffuser case, and removing the inner diffuser case from the mold.

These and other aspects and features of the present disclosure will be more readily understood when read in conjunction with the accompanying drawings.

BRIEF DESCRIPTION OF THE DRAWINGS

FIG. 6 is a cross-sectional view through the section 6-6 of FIG. 5.

FIG. 7 is a cross-sectional view through the section 7-7 of FIG. 5.

It should be understood that the drawings are not necessarily drawn to scale and that the disclosed embodiments are sometimes illustrated schematically and in partial views. It is to be further appreciated that the following detailed description is merely exemplary in nature and is not intended to limit the invention or the application and uses thereof. Hence, although the present disclosure is, for convenience of explanation, depicted and described as certain illustrative embodiments, it will be appreciated that it can be implemented in various other types of embodiments and in various other systems and environments.

DETAILED DESCRIPTION

Figure 1:
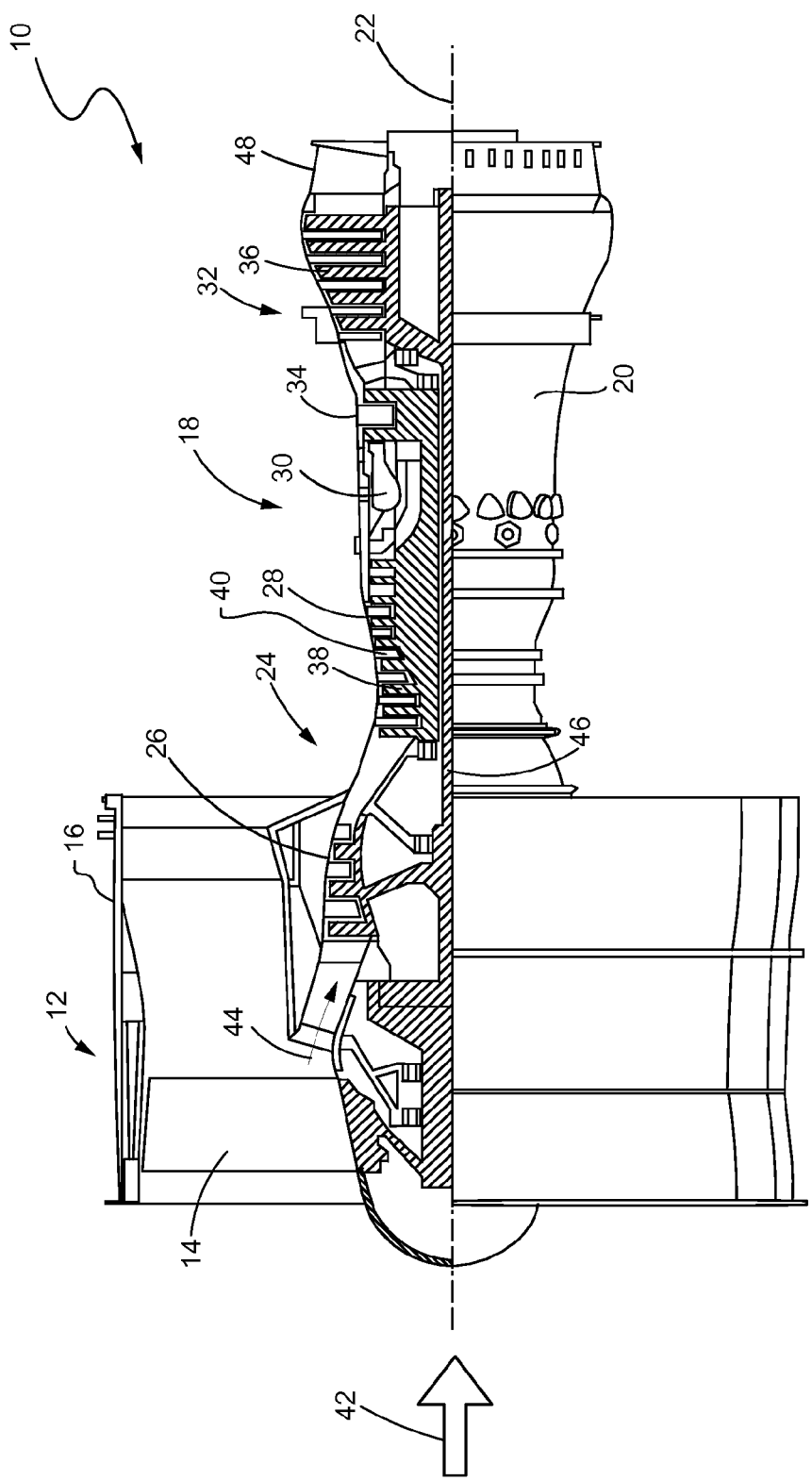
FIG. 1 is a cross-sectional view of an embodiment of a gas turbine engine, constructed in accordance with the present disclosure.

Referring now to the drawings, and with specific reference to FIG. 1, a gas turbine engine 10 is shown. The gas turbine engine 10 may be associated with an aircraft to provide thrust, or it may be used to provide power in other applications. The gas turbine engine 10 may include a fan section 12 having a fan 14 surrounded by a fan case 16, as well as a core engine 18 that is surrounded by an engine case 20 and located axially downstream of the fan 14 with respect to an engine central axis 22. In an upstream to downstream direction, the core engine 18 may include: 1) a compressor section 24 which may include a low pressure compressor (LPC) 26 upstream from a high pressure compressor (HPC) 28, 2) one or more combustors 30, and 3) a turbine section 32 which may include a high pressure turbine (HPT) 34 upstream from a low pressure turbine (LPT) 36. In addition, the compressor section 24 and the turbine section 32 may include alternating stages of rotor assemblies 38, having rotating airfoils (or blades), and stator assemblies 40, having non-rotating airfoils (or vanes). Although the gas turbine engine 10 is shown as a two spool turbofan engine, it will be understood that the engine 10 may have other architectures as well, such as a three-spool turbofan with an intermediate pressure compressor section and an intermediate pressure turbine section.

In operation, air 42 may be drawn into the engine 10 and it may be accelerated by the rotating blades of the fan 14. After passing through the fan section 12, a fraction of the indrawn air 42 may be routed through a primary airflow pathway 44 defined by the core engine 18, as shown. In the primary airflow pathway 44, the air 42 may first be compressed/pressurized in the LPC 26 and the HPC 28 of the compressor section 24, and it may then enter the combustor(s) 30 where it may be mixed with fuel and combusted to generate hot combustion gases. The hot combustion gases may then expand through and drive the rotation of the HPT 34 and the LPT 36 which may, in turn, drive the rotation of the fan 14 and the compressor section 24, as all may be interconnected through one or more common shafts 46. The gases may then be exhausted through an exhaust nozzle 48 to provide forward thrust to an associated aircraft, or power for other applications.

Figure 2:
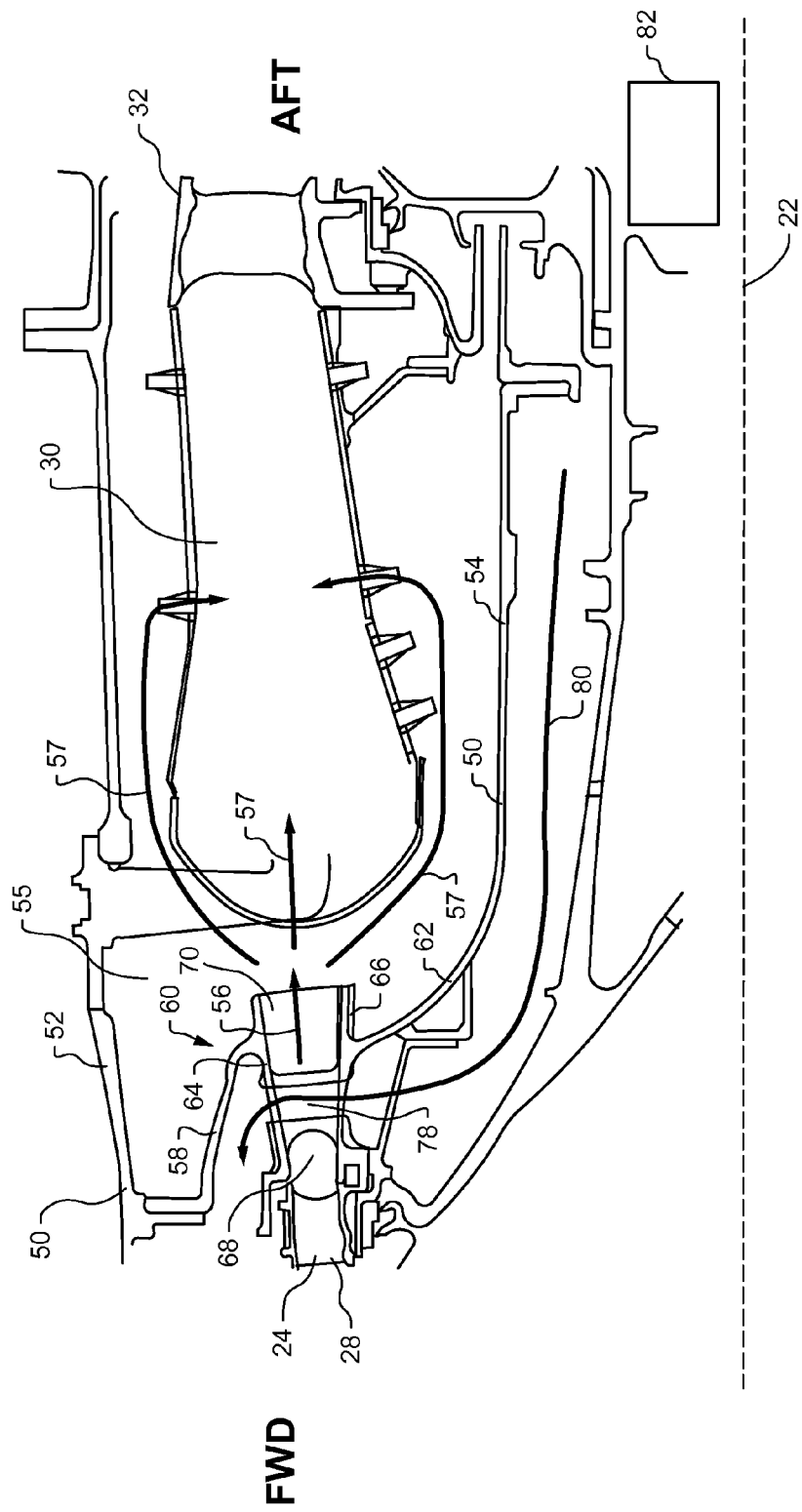
FIG. 2 is a cross-sectional view of a diffuser case of the gas turbine engine of FIG. 1, constructed in accordance with the present disclosure.

Turning now to FIG. 2, a diffuser case 50 at an outlet of the compressor section 24 (i.e., the HPC 28) is shown. The diffuser case 50 may include an annular outer diffuser case 52 and an annular inner diffuser case 54, both of which may circumscribe the central axis 22. Specifically, the inner diffuser case 54 may be located radially inside of the outer diffuser case 52 to define a plenum 55 there between for carrying a primary airflow 56 (of the primary airflow pathway 44) into the combustor 30 via a number of pathways 57 (which may include numerous other pathways than those shown).

Figure 3:
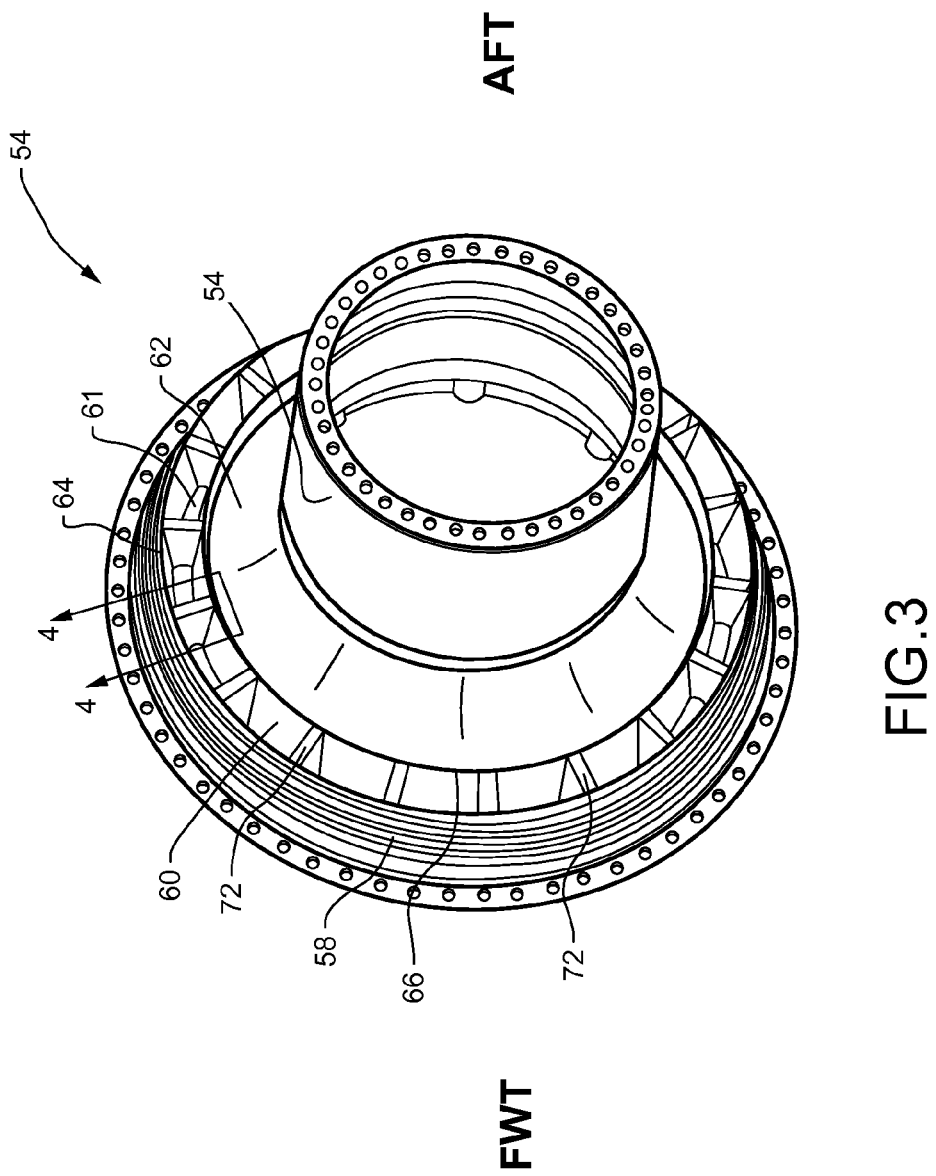
FIG. 3 is a side perspective view of an inner diffuser case of FIG. 2 shown in isolation, constructed in accordance with the present disclosure.

Referring now to FIGS. 2 and 3, the inner diffuser case 54 may include a cone 58 at an upstream location of the inner diffuser case 54, a pre-diffuser 60 radially inward of the cone 58, and a radially inwardly curving skirt 62 downstream of the pre-diffuser 60, as shown. The pre-diffuser 60 may have passages 61 for carrying the primary airflow 56 exiting the compressor section 24 into the plenum 55. The pre-diffuser 60 may include an annular outer wall 64 and an annular inner wall 66 radially inside of the outer wall 64, and the outer wall 64 and the inner wall 66 may define the passages 61 for the primary airflow 56 therebetween (also see FIG. 4). In particular, the outer wall 64 and the inner wall 66 may diverge radially from an inlet 68 to an outlet 70 of the passage in order to reduce the velocity of the compressed gases exiting the compressor section 24 by area expansion. For structural support, the pre-diffuser 60 may further include one or more struts 72 extending radially between the inner wall 66 and the outer wall 64 (also see FIG. 4). In one aspect of the present disclosure, the pre-diffuser 60 may have a plurality of the struts 72 disposed symmetrically about the circumference of the pre-diffuser 60, as shown. As will be appreciated, the total number of the struts 72 in the pre-diffuser 60 may depend on the diameter and design of the pre-diffuser.

Figure 5:
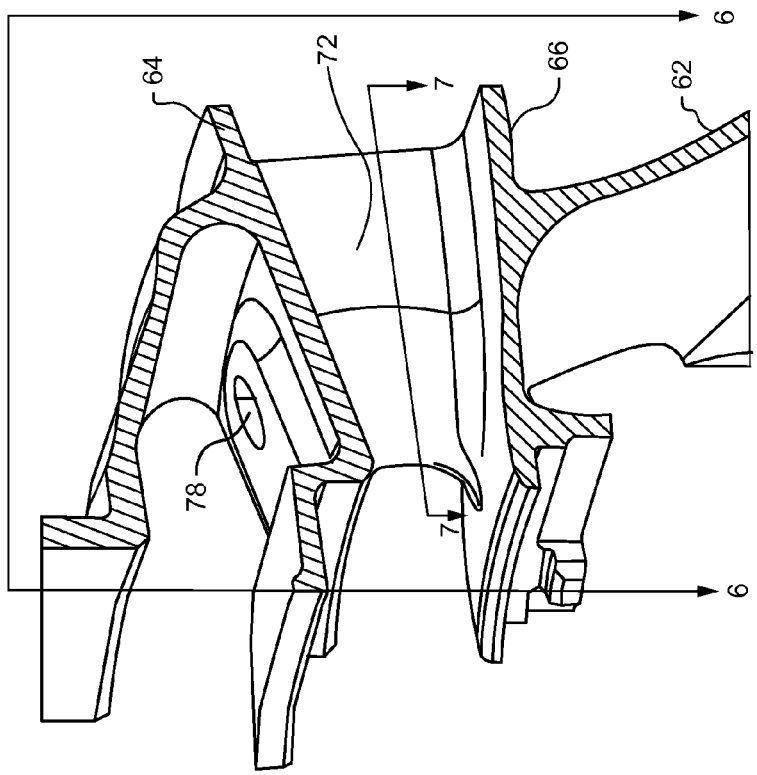
FIG. 5 is a side perspective view of the pre-diffuser strut of FIG. 4, constructed in accordance with the present disclosure.
Figure 4:
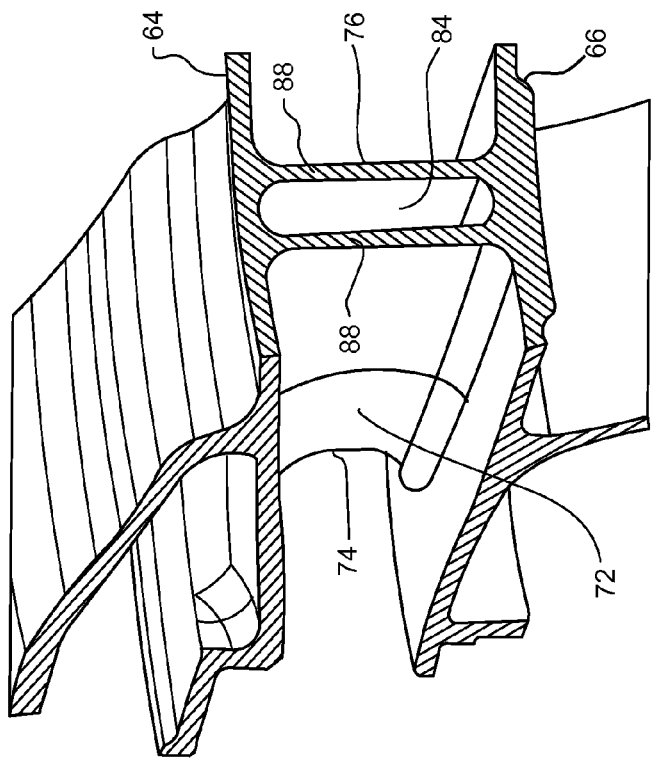
FIG. 4 is fragmentary aft perspective view of the section 4-4 of FIG. 3, depicting a strut of a pre-diffuser of the inner diffuser case, constructed in accordance with the present disclosure.

Turning now to FIGS. 4-5, the structure of a single strut 72 of the pre-diffuser 60 is shown in more detail. The strut 72 may have a forward side 74 oriented toward the inlet 68, and an aft side 76 oriented toward the outlet 70. In general, the strut 72 may be wedge-shaped, and it may increase in lateral width from the forward side 74 to the aft side 76. As shown in FIG. 5, the strut 72 may also have at least one aperture 78 extending radially through the strut 72 and penetrating through the inner wall 66 and the outer wall 64 (also see FIG. 2). The aperture 78 may provide a passage for secondary cooling airflow 80 which may flow from a bearing compartment 82 located radially inward of the turbine section 32 to an aft portion of the compressor section 24 (see FIG. 2). In one aspect of the present disclosure, the aperture 78 may be offset from an angle perpendicular to engine axis 22. For example, it may be oriented at a slightly obtuse angle with respect to the engine axis 22 (see FIG. 2). In addition, the strut 72 may further include a hollow cavity 84 which may reduce the overall weight of the pre-diffuser 60 as compared to pre-diffuser struts with a solid construction. As one possibility, the hollow cavity 84 may be on the aft side 76 of the strut 72 and aft of the aperture 78, although it may be on the forward side 74 as well. Thus, the strut 72 of the present disclosure may have functions that extend beyond structural support of the pre-diffuser 60. Specifically, the strut 72 may provide a passage for secondary airflow 80 (via the aperture 78), as well as weight reducing features provided by both the aperture 78 and the hollow cavity 84.

Cross-sectional views of the strut 72 are shown in FIGS. 6-7. As best shown in FIG. 7, the strut 72 may include a radially-extending wall 86 which may separate the aperture 78 from the hollow cavity 84, as well as two outer walls 88 extending axially from the wall 86 to an open end 90 on the aft side 76 of the strut 72. In addition, the outer walls 88 may both extend radially from the inner wall 66 to the outer wall 64 (see FIG. 4). In particular, the outer walls 88 may define the hollow cavity 84 therebetween, such that the hollow cavity 84 terminates at and includes the open end 90. In one aspect of the present disclosure, the outer walls 88 may each have a thickness (t) of between about 1.5 millimeters to about 2.3 millimeters, although the wall thicknesses may extend beyond this range as well. Applicants have found that such wall thicknesses may be advantageous for balancing weight reduction with sufficient structural support. Furthermore, with such wall thicknesses, the hollow cavity 84 may have a lateral width (w) of between about 5 millimeters and about 7 millimeters, and the aperture 78 may have an axial diameter (d) of about 10 mm, although such dimensions may certainly extend beyond these ranges depending on the size/design of the pre-diffuser 60. In general, however, the aperture 78 may have a fixed axial diameter (d) along the radial length of the aperture (see FIG. 6), while the hollow cavity 84 may have a fixed lateral width (w) along the axial length of the hollow cavity (FIG. 7) but a varying radial height (h) along the axial length of the hollow cavity (FIG. 6). Specifically, the radial height (h) of the hollow cavity 84 may steadily increase from the wall 86 to the open end 90 due to the diverging walls 64 and 66.

Figure 8:
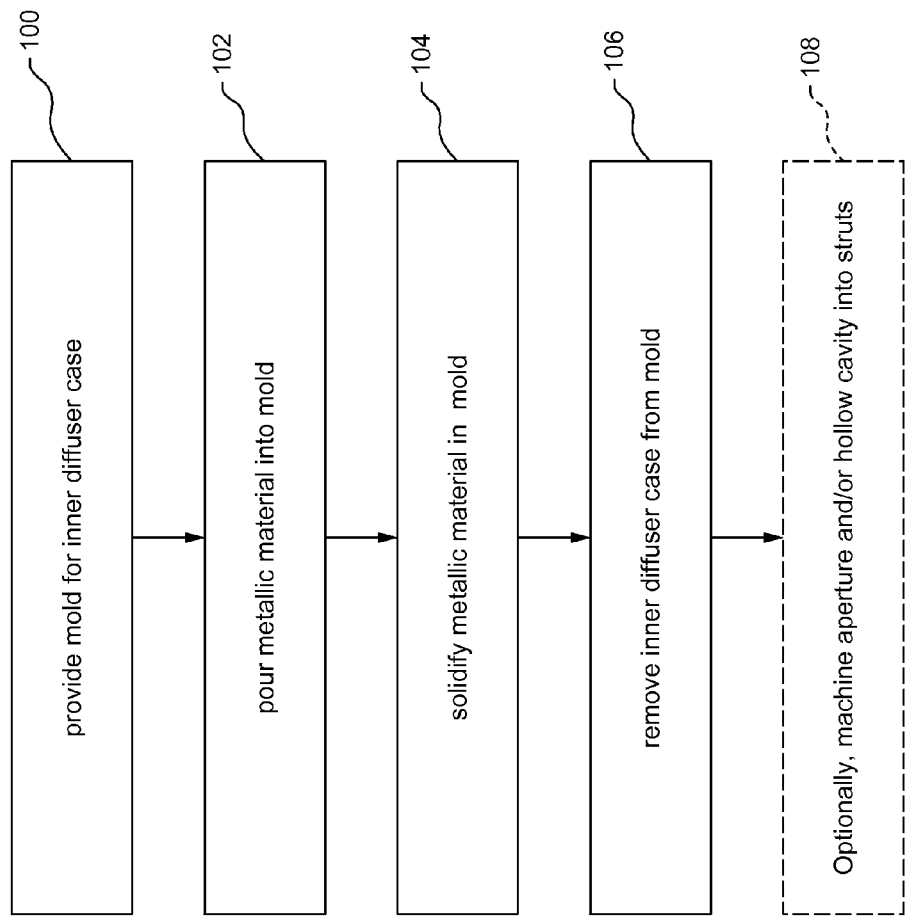
FIG. 8 is a flowchart illustrating a sample sequence of steps that may be used to fabricate the inner diffuser case, in accordance with an embodiment of a method of the present disclosure.

Turning now to FIG. 8, a series of steps that may be involved in fabricating the inner diffuser case 54 having the pre-diffuser 60 are shown. It is first noted that the fabrication steps for the inner diffuser case 54 shown in FIG. 8 may largely involve cast molding. Beginning with a first block 100, a mold for the inner diffuser case 54 may be provided. Specifically, the mold may be configured to shape the pre-diffuser 60 including the outer wall 64, the inner wall 66, and the strut(s) 72, as well as other features such as the cone 58 and the skirt 62. Furthermore, the mold may also be configured to shape the apertures 78 and/or the hollow cavities 84 in the struts 72, or they may be machined into the structure after casting (see below). Metallic material (as a powder or a liquid) may then be poured into the mold and solidified in the mold to shape inner diffuser case 54 according to the next blocks 102 and 104. Once removed from the mold according to a next block 106, the inner diffuser case 54 having the pre-diffuser 60 may be provided. However, in some situations, different sections of the inner diffuser case 54 may be separately formed by casting, and then later joined together to construct the full inner diffuser case 54. If the mold is configured to shape both the apertures 78 and the hollow cavities 84 in the struts 72, then fabrication of the inner diffuser case 54 having the pre-diffuser 60 may be complete at the block 106. If, however, the pre-diffuser 60 lacks either or both of the apertures 78 and the hollow cavities 84 after casting, then the apertures 78 and/or the hollow cavities 84 may be installed in the case 60 by machining or another suitable process according to an optional block 108.

INDUSTRIAL APPLICABILITY

In general, it can therefore be seen that the technology disclosed herein has industrial applicability in a variety of settings including, but not limited to, gas turbine engines. The present disclosure provides a pre-diffuser strut having structural features that may improve gas turbine engine function and efficiency. Specifically, the strut disclosed herein includes an aperture which may reduce the weight of the pre-diffuser, while providing a passage for the flow of secondary cooling air through the engine. In addition, the strut also includes a hollow cavity which may further reduce the weight of the pre-diffuser without negatively impacting the aerodynamic performance or the structural stability of the pre-diffuser of the inner diffuser case. Thus, the pre-diffuser strut may provide improvements in the fuel efficiency of the gas turbine engine as a whole. It is expected that the technology disclosed herein may find wide industrial applicability in a wide range of areas such as, but not limited to, aerospace and power generation applications.

What is claimed is:

1. A pre-diffuser of an inner diffuser case for a gas turbine engine, comprising:
   an annular outer wall;
   an annular inner wall radially inside of the annular outer wall, the annular outer wall and the annular inner wall defining a passage for primary airflow therebetween;

at least one strut extending radially between the annular inner wall and the annular outer wall;

at least one aperture formed in the at least one strut, the at least one aperture extending radially and completely through the at least one strut, the annular inner wall, and the annular outer wall to provide a secondary cooling airflow passage between a bearing compartment and an aft portion of a compressor section of the gas turbine engine;

at least one hollow cavity formed in the at least one strut, the at least one hollow cavity being separate from the at least one aperture; and wherein the at least one strut includes a forward side upstream from an aft side, and wherein the at least one hollow cavity is aft of the at least one aperture on the aft side of the at least one strut.

2. The pre-diffuser of claim 1, wherein the at least one strut includes a radially-extending wall separating the at least one aperture and the at least one hollow cavity.

3. The pre-diffuser of claim 2, wherein the at least one strut includes two outer walls extending axially between the radially-extending wall and an open end on the aft side of the at least one strut, and wherein the two outer walls further extend radially between the annular inner wall and the annular outer wall.

4. The pre-diffuser of claim 3, wherein the two outer walls define the at least one hollow cavity therebetween, and wherein the at least one hollow cavity includes the open end.

5. The pre-diffuser of claim 4, wherein each of the two outer walls have an average wall thickness of between 1.5 millimeters and 2.3 millimeters.

6. The pre-diffuser of claim 4, wherein the at least one strut comprises a plurality of the struts, and wherein each strut of the plurality of struts includes a respective aperture of the at least one aperture and a respective hollow cavity of the at least one hollow cavity.

7. The pre-diffuser of claim 6, wherein the pre-diffuser is cast using a mold.

8. The pre-diffuser of claim 6, wherein the plurality of apertures and the plurality of hollow cavities are formed by machining.

9. The pre-diffuser of claim 1, wherein the annular inner wall and the annular outer wall diverge radially with respect to each other from an inlet of the passage to an outlet of the passage.

10. A gas turbine engine, comprising:
a fan section;
a core engine downstream of the fan section and including a compressor section, a combustor, and a turbine section; and
a diffuser case at an outlet of the compressor section and having an annular outer diffuser case and an annular inner diffuser case radially inside of the annular outer diffuser case, the annular inner diffuser case having a pre-diffuser at an upstream portion of the annular inner diffuser case, the pre-diffuser including an annular outer wall, an annular inner wall radially inside of the annular outer wall, the annular outer wall and the annular inner wall defining a passage for primary airflow therebetween, at least one strut extending radially between the annular inner wall and the annular outer wall, at least one aperture formed in the at least one strut, the at least one aperture extending radially and completely through the at least one strut, the annular inner wall, and the annular outer wall to provide a secondary cooling airflow passage between a bearing compartment and an aft portion of the compressor section of the gas turbine engine, at least one hollow cavity formed in the at least one strut, the at least one hollow cavity being separate from the at least one aperture, and wherein the at least one strut includes a forward side upstream from an aft side, and wherein the at least one hollow cavity is aft of the at least one aperture on the aft side of the at least one strut.

11. The gas turbine engine of claim 10, wherein the at least one strut includes a radially-extending wall separating the at least one aperture and the at least one hollow cavity.

12. The gas turbine engine of claim 11, wherein the at least one strut includes two outer walls extending axially between the radially-extending wall and an open end on the aft side of the at least one strut, and wherein the two outer walls further extend radially between the annular inner wall and the annular outer wall.

13. The gas turbine engine of claim 12, wherein the two outer walls define the at least one hollow cavity therebetween, and wherein the at least one hollow cavity includes the open end.

14. The gas turbine engine of claim 13, wherein each of the two outer walls have an average wall thickness of between 1.5 millimeters and 2.3 millimeters.

15. The gas turbine engine of claim 12, wherein the at least one strut comprises a plurality of the struts, wherein each strut of the plurality of struts includes a respective aperture of the at least one aperture and a respective hollow cavity of the at least one hollow cavity.

16. The gas turbine of claim 10, wherein the annular inner wall and the annular outer wall diverge radially with respect to each other from an inlet of the passage to an outlet of the passage.

* * * * *